(12) United States Patent
Bordini (10) Patent No.: US 7,284,633 B2
(45) Date of Patent: Oct. 23, 2007

(54) TRACTOR SUSPENSION WITH TENSIONED DRIVE SHAFT

(75) Inventor: Giorgio Bordini, Tenerife Canarias (ES)

(73) Assignee: CNH America LLC, New Holland, PA (US)

( * ) Notice: Subject to any disclaimer, the term of this patent is extended or adjusted under 35 U.S.C. 154(b) by 101 days.

(21) Appl. No.: 11/232,373

(22) Filed: Sep. 21, 2005

(65) Prior Publication Data

US 2006/0027992 A1 Feb. 9, 2006

Related U.S. Application Data

(63) Continuation-in-part of application No. 10/911,888, filed on Aug. 5, 2004, now Pat. No. 7,204,340.

(51) Int. Cl.
*B60K 17/00* (2006.01)

(52) U.S. Cl. ........................ 180/372; 180/348

(58) Field of Classification Search ................ 180/342, 180/343, 348, 349, 353, 355, 356, 359, 360, 180/361, 363, 372, 253, 408; 280/6.154
See application file for complete search history.

(56) References Cited

U.S. PATENT DOCUMENTS

| | | | |
|---|---|---|---|
| 4,053,171 A | 10/1977 | Hyler | |
| 4,614,247 A | 9/1986 | Sullivan | |
| 4,860,843 A * | 8/1989 | Baltensperger | 180/373 |
| 5,404,958 A | 4/1995 | Weiss | |
| 5,538,264 A | 7/1996 | Brown et al. | |
| 6,042,131 A | 3/2000 | Bailey | |
| 6,176,334 B1 * | 1/2001 | Lorenzen | 180/9.48 |
| 6,491,129 B1 | 12/2002 | Young et al. | |
| 6,502,840 B1 | 1/2003 | Leyonhjelm et al. | |
| 6,722,994 B2 | 4/2004 | Woods et al. | |
| 6,915,873 B2 * | 7/2005 | Woods et al. | 180/361 |
| 2002/0175486 A1 | 11/2002 | Young et al. | |
| 2003/0047892 A1 | 3/2003 | Goddard | |

OTHER PUBLICATIONS

U.S. Appl. No. 11/156,687, "C-Beam Suspension Support," filed Jun. 20, 2005, Giorgio Bordini, inventor.
U.S. Appl. No. 11/005,281, "Suspension With Torsion-Resisting Cylinder," filed Dec. 6, 2004, Giorgio Bordini, inventor.
U.S. Appl. No. 11/051,438, "Steerable Rear Tractor Suspension," filed Feb. 4, 2005, Giorgio Bordini, inventor.
U.S. Appl. No. 10/911,888, "Tractor Rear Suspension," filed Aug. 5, 2004, Giorgio Bordini, inventor.

* cited by examiner

*Primary Examiner*—Ruth Ilan
*Assistant Examiner*—Tiffany L. Webb
(74) *Attorney, Agent, or Firm*—Patrick M. Sheldrake; John William Stader; Michael G. Harms (57) ABSTRACT

An agricultural tractor rear suspension system having a longitudinally extending suspension arm pivotally coupled to the tractor chassis at one end and to a planetary gearbox at the opposing end, a differential connected to the tractor chassis, and a driveshaft rotatably supported at one end by the planetary gearbox and supported at the other end by the differential housing wherein the driveshaft is configured to resist suspension arm flexural by communicating tensile and compressive forches from the suspension arm to the tractor chassis.

21 Claims, 7 Drawing Sheets

TRACTOR SUSPENSION WITH TENSIONED DRIVE SHAFT

CROSS-REFERENCE TO RELATED APPLICATIONS

This application is a continuation-in-part of U.S. Patent application Ser. No. 10/911,888, filed Aug. 5, 2004 now U.S. Pat. No. 7,204,340.

FIELD OF THE INVENTION

The present invention relates generally to suspensions. More particularly, it relates to tractor suspensions, and even more particularly to rear suspensions for agricultural tractors having a drive shaft configured to be tensioned to resist suspension flexural.

BACKGROUND OF THE INVENTION

Agricultural tractors have traditionally been unsprung. From their earliest beginnings in the late 1800's they have been supported on fixed axles extending from the chassis.

Originally, tractors were used as stationary engines. Located in a fixed position in a field, farmers would gather crops to be threshed and bring them in wagon loads to the tractor and a belt-driven threshing machine. In these early days, the ability to move fast was not important.

Tractors were gradually modified to tow implements such as plows, rakes, harrows, planters, and manure spreaders through agricultural fields. These mobile tractors did not need a great deal of speed since they replaced horses or oxen and needed only enough power to tow implements at horse or ox speed.

As time passed, engineers designed ever larger and stronger implements. To tow these implements, tractors were also made stronger and larger, with ten to fifty times the horsepower of the early tractors.

Eventually, agricultural tractors were capable of towing implements at higher speeds through agricultural fields. To accommodate these greater speeds, manufacturers began to develop front suspensions with springing and shock absorbing capability. These front suspensions were configured to pivot, permitting the front wheels of the tractor to keep a good grip on the ground as the terrain changed. As of today, however, no major manufacturer of tractors sells a commercially accepted agricultural tractor with a sprung rear suspension.

A primary reason that tractors with sprung rear suspensions have not been manufactured is due to the reaction forces that arise when a load is placed on the tractor. Traditional agricultural tractors have large rear wheels, typically on the order of approximately 1 to 2.2 meters in diameter. The large rear wheels apply high force to the ground, especially when a ground-engaging implement is ripping furrows through the ground 2 to 18 inches deep. The ground, in turn, applies an equally high (but in the opposite direction) reaction force on the frame of the tractor, and the reaction force can generate a moment great enough to literally lift the front wheels of a tractor without a rear suspension a meter or more off of the ground.

The existence of a moment large enough to lift the front wheels is best illustrated with reference to FIG. 11, which schematically shows a tractor 700 without a front or rear suspension towing an implement 148. An implement, resultant-force vector 402 is applied to the implement by the ground as the implement is pulled through the ground by the tractor 700. Implement force vector 402 can be broken down into two force vectors 404, 406 that represent the horizontal force (vector 404) acting to drag on the implement during forward motion, and the vertical force (vector 406) that pulls downward on the implement.

The implement is rigidly coupled to the tractor typically through a three-point hitch. The three-point hitch couples the implement to the tractor frame via a lower point A and an upper point B. The implement force vector 402 applies draft forces on the tractor that can be separated into horizontal and vertical forces $F_{Ax}$ and $F_{Ay}$ acting through the lower link 902 (i.e., at point A) and horizontal and vertical forces $F_{Bx}$ and $F_{By}$ acting through the upper link 904 (i.e., at point B). As one of ordinary skill will appreciate, the relative magnitudes of the component draft forces $F_{Ax}$, $F_{Ay}$, $F_{Bx}$ and $F_{By}$ depend upon the geometry of the three-point pitch.

Other forces acting on the tractor 700 include weight (depicted in the drawing as mg), which acts on the center of gravity $C_G$. In response to the weight, the ground applies forces $F_f$ and $F_r$ to the tractor through the front and rear axles, respectively.

Figure 11:
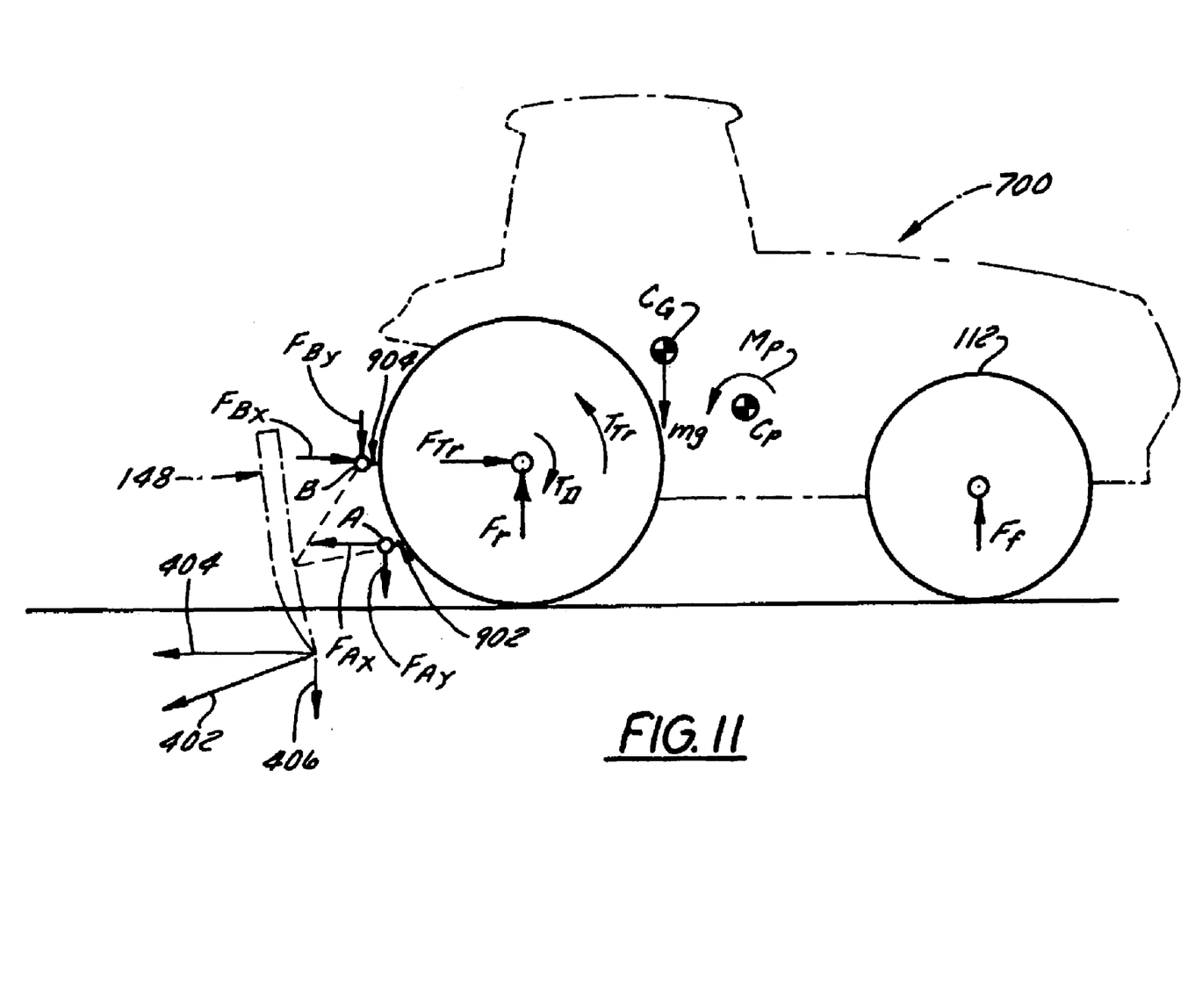
FIG. 11 is a force diagram of the tractor of the foregoing FIGURES showing the forces applied by the tractor to the ground and the reaction forces applied to the tractor.

There are torques shown in FIG. 11 as well. Drive torque $T_D$ is the torque applied by the engine (not shown in FIG. 11) to the axle (also not shown) to drive the rear wheels. When the tractor is being driven forward, the drive torque is clockwise. The rear wheels, as they are being driven, apply a force on the ground, and the ground, in turn, applies an equal and opposite traction force $F_{Tr}$ on the wheels that is applied to the tractor frame. The traction force of course is responsible for forward movement of the tractor.

Drive torque $T_D$ also generates a reaction torque (that is, traction torque $T_{Tr}$) that acts on the frame of the tractor. The traction torque is proportional to the traction force $F_{Tr}$ and is counterclockwise.

The forces and torques generate moments about a point on the tractor that tend to rotate the tractor about that point. For convenience, the point will be called the center of pitch $C_p$. Its location depends upon a number factors one of ordinary skill will appreciate. While the forces and torques may generate moments that cancel each other out to some extent, the net effect of all of the moments is to generate a counterclockwise moment $M_p$ about the center of pitch when the implement force vector 402 increases. The implement force vector increases when the implement 148 hits a stone, compacted soil, or some other such condition. As previously mentioned, the increased implement force vector can be large enough to cause a moment $M_p$ about the center of pitch that is itself large enough to lift the front tires and increase the load on the rear tires.

If the rear wheels were suspended on the frame rather than being fixed, the moment $M_p$ will not at first lift the front wheels, but it will tend to cause the rear suspension to squat. Such squatting can be disconcerting to the operator and can also wreak havoc on implement depth-control systems, which typically require a constant relationship between the tractor-frame and implement-frame heights.

One of ordinary skill will appreciate that some suspension configurations will cause the tractor to rotate clockwise (rather than counterclockwise, as has been described) when the tractor is subjected to increased loads. However, for the purposes of this discussion, we will consider the more intuitive case where the tractor rotates counterclockwise in response to increased loads. Nevertheless, the basic principles (and the problems with conventional systems) described herein are the same. Moreover, the principle of operation of the preferred embodiments (which will be described below) is the same regardless of whether the suspension tends to squat or sit up.

The suspension arrangement of the present invention generates a reaction torque on the vehicle to reduce the moment $M_P$ about the center of pitch. In other words, when the tractor pulls harder on its implement, the suspension in accordance with the present invention generates an increased counteracting, or reaction, force that matches or is proportional to the increased, horizontal force vector 404. Similarly, when the tractor pulls more gently on its implement, the suspension in accordance with the present invention generates a decreased force that matches the decreased horizontal force vector 404.

The applicant, in his co-pending patent application U.S. patent application Ser. No. 10/911,888, described a tractor that would solve many of these problems.

One problem that was not addressed by the tractor of that application was the undesirable flexing of the suspension arms when the tractor is placed under extreme loads. Agricultural tractors are not designed to go fast, but to go slow and generate extremely large pulling forces. As the force diagram in FIG. 11 illustrates, the forces can be quite large. They can be so large, in fact, that the suspension arms are deflected inward or outward, pulled away from or pressed toward the vehicle. If the forces are large enough, they can bend the suspension arms. They can also damage the pivot joint that couples the suspension arms to the chassis of the tractor.

What is needed, therefore, is a suspension arrangement that counters the flexure of the suspension arms and reduces the forces otherwise applied to the suspension arm pivot joint. What is also needed is an apparatus for countering these forces that uses an existing structure coupling between the suspension arm and the chassis. What is also needed is an apparatus for transmitting longitudinal loads though a rotating drive shaft.

It is an object of this invention to provide a tractor and tractor suspension that has these benefits.

SUMMARY OF THE INVENTION

In accordance with a first aspect of the invention, a rear tractor suspension for a tractor chassis having a differential mounted in a differential housing is provided, the suspension comprising a longitudinally extending suspension arm pivotally coupled to the chassis; a planetary gearbox fixed to the suspension arm; and a drive shaft rotatably supported at one end by the planetary gearbox, and rotatably supported at the other end by the differential housing, wherein the drive shaft is configured to reduce additional outward flexure of the suspension arm when the suspension arm is outwardly flexed, and to reduce additional inward flexure of the suspension arm when the suspension arm is inwardly flexed.

The drive shaft may further comprise first and second stub shafts coupled together to permit the stub shafts relative longitudinal sliding movement and to communicate a longitudinal tensile load. The drive shaft may be configured to be placed in longitudinal compression by non-plastic deformation of the suspension arm inward toward the chassis and to be placed in longitudinal tension by non-plastic deformation of the suspension arm outward away from the chassis, respectively. The tension and the compression may communicate a load from the suspension arm to the chassis of the vehicle. The drive shaft may reduce outward flexure by being placed in tension and the drive shaft may reduce inward flexure by being placed in compression. The drive shaft may further comprise first and second flexible shaft couplings; and a sliding coupling that is coupled to and between the first and second flexible shaft couplings.

In accordance with a second aspect of the invention, a rear suspension for an agricultural tractor having chassis comprised of an engine, transmission and rear differential housing fixed together to form an elongate rigid member is provided, the suspension comprising a longitudinally extending suspension arm coupled to the chassis to pivot with respect thereto about a laterally-extending axis; a planetary gearbox fixed to the suspension arm; a drive shaft rotatably supported at one end by the planetary gearbox and rotatably supported at the other end by the tractor chassis, wherein the drive shaft is configured to be longitudinally compressed to reduce lateral inward flexure of the suspension arm, and configured to be longitudinally tensioned to reduce lateral outward flexure of the suspension arm during normal operation. The drive shaft may further comprise first and second stub shafts coupled together with a sliding coupling to communicate torque from one stub shaft to the other stub shaft, to permit sliding relative longitudinal movement of the stub shafts, to communicate a tensile load from one stub shaft to the other stub shaft when the coupling is collapsed, and to communicate a compressive load from one stub shaft to the other stub shaft when the coupling is extended. The sliding coupling may be configured to be placed in longitudinal tension by flexure of the suspension arm away from the chassis of the tractor and placed in longitudinal compression by flexure of the suspension arm toward the chassis of the tractor. The tension and the compression may communicate a load on the suspension arm to the chassis of the vehicle. The drive shaft may further comprise first and second flexible shaft couplings disposed in the drive shaft to support opposing ends of the sliding coupling. The drive shaft may reduce outward suspension arm flexure by being placed in tension and reduces inward suspension arm flexure by being placed in compression.

In accordance with a third aspect of the invention, a rear tractor suspension for a tractor chassis having a differential mounted in a differential housing is provided, the suspension comprising a longitudinally extending suspension arm pivotally coupled to the chassis; a planetary gearbox fixed to the suspension arm; and a means for rotatably driving the planetary gearbox supported for rotation both by the planetary gearbox and by the tractor chassis, wherein the means for rotatably driving is configured to be longitudinally tensioned and compressed during normal operations.

The means for driving may further include first flexible coupling means; second flexible coupling means; and slidable coupling means; wherein first flexible coupling means is fixed to a first end of slidable coupling means and second flexible coupling means is fixed to another end of slidable coupling means. The slidable coupling means may include means for telescopically extending and retracting and a means for transmitting torque. The slidable coupling means may be configured to be placed in longitudinal compression by non-plastic deformation of the suspension arm inward toward the chassis and in longitudinal tension by non-plastic deformation of the suspension arm outward away from the chassis, respectively. The tension and the compression may communicate a load on the suspension arm to the chassis of the vehicle.

The slidable coupling means may reduce outward arm flexure by being placed in tension and may reduce inward arm flexure by being placed in compression. One end of the slidable coupling means may comprise a cup having internal splines. The other end of the slidable coupling means may comprise a cylinder having external splines. The cylinder may be slidably supported within the cup and the internal splines are engaged with the external splines.

Numerous other features and advantages of the present invention will become readily apparent from the following detailed description, the accompanying drawings, and the appended claims.

DETAILED DESCRIPTION OF THE PREFERRED EMBODIMENTS

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Figure 1:
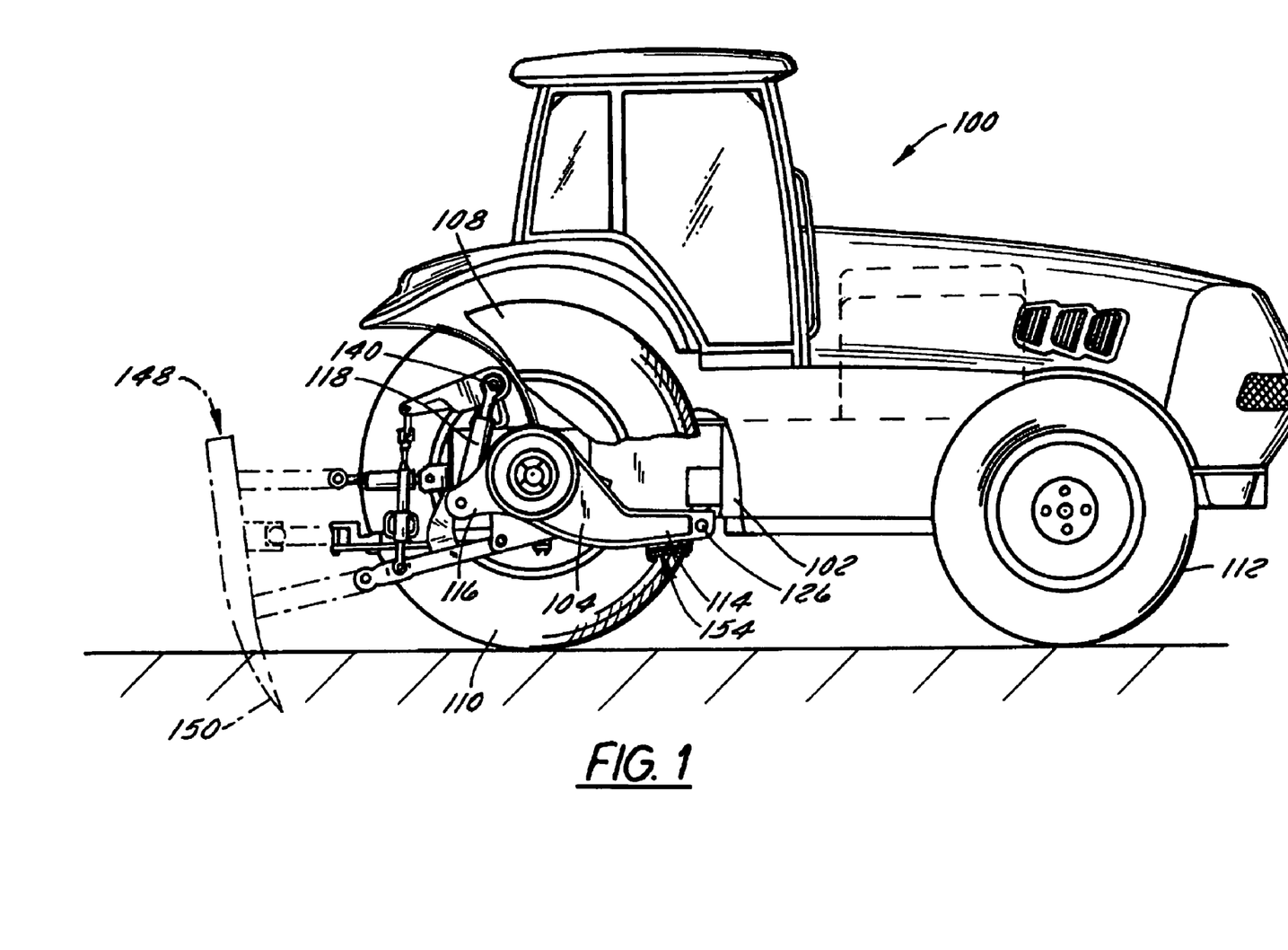
FIG. 1 is a side view of a tractor in accordance with the present invention.
Figure 2:
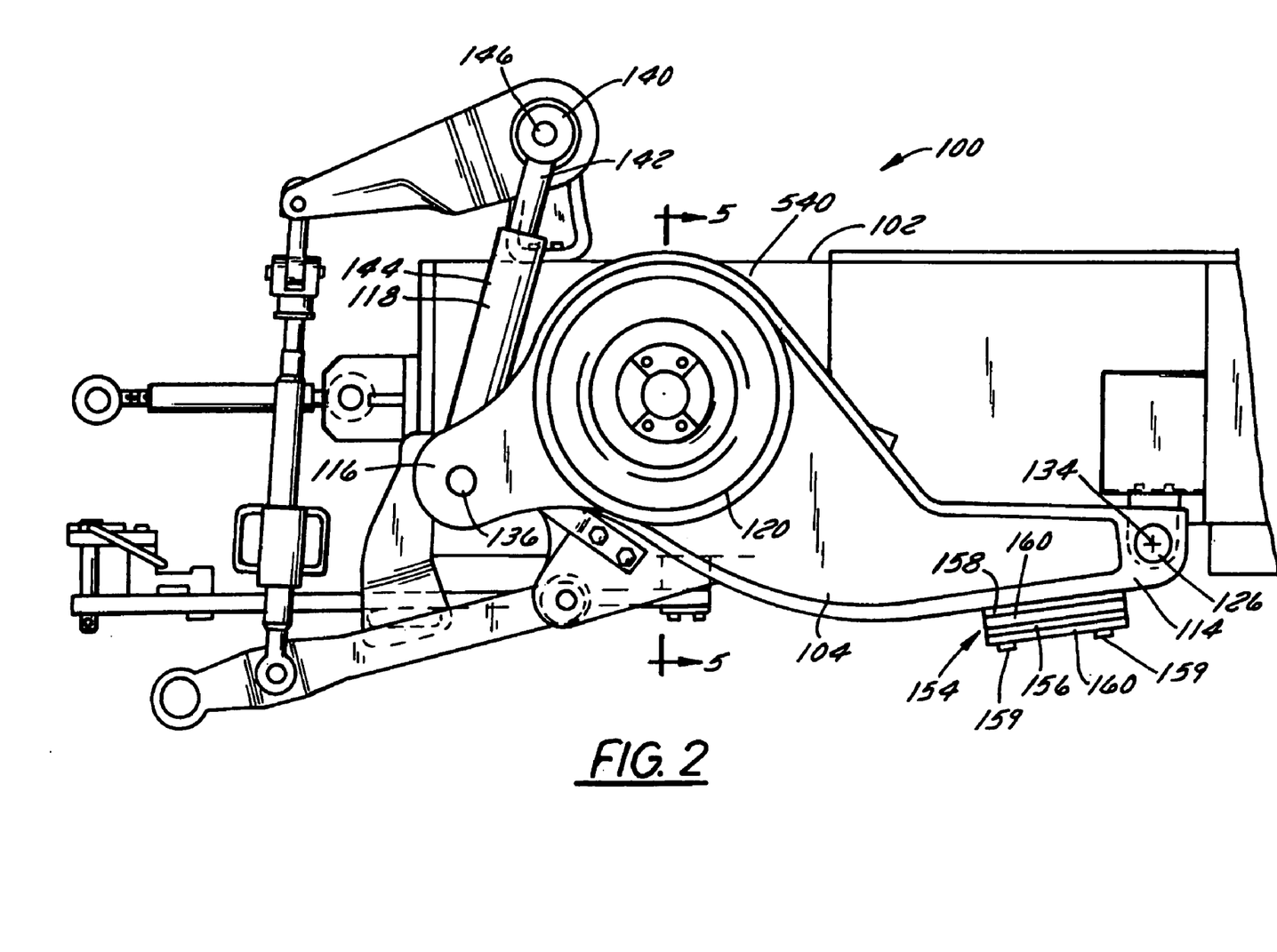
FIG. 2 is a fragmentary side view of the tractor of FIG. 1, showing the chassis and right rear suspension in greater detail.
Figure 3:
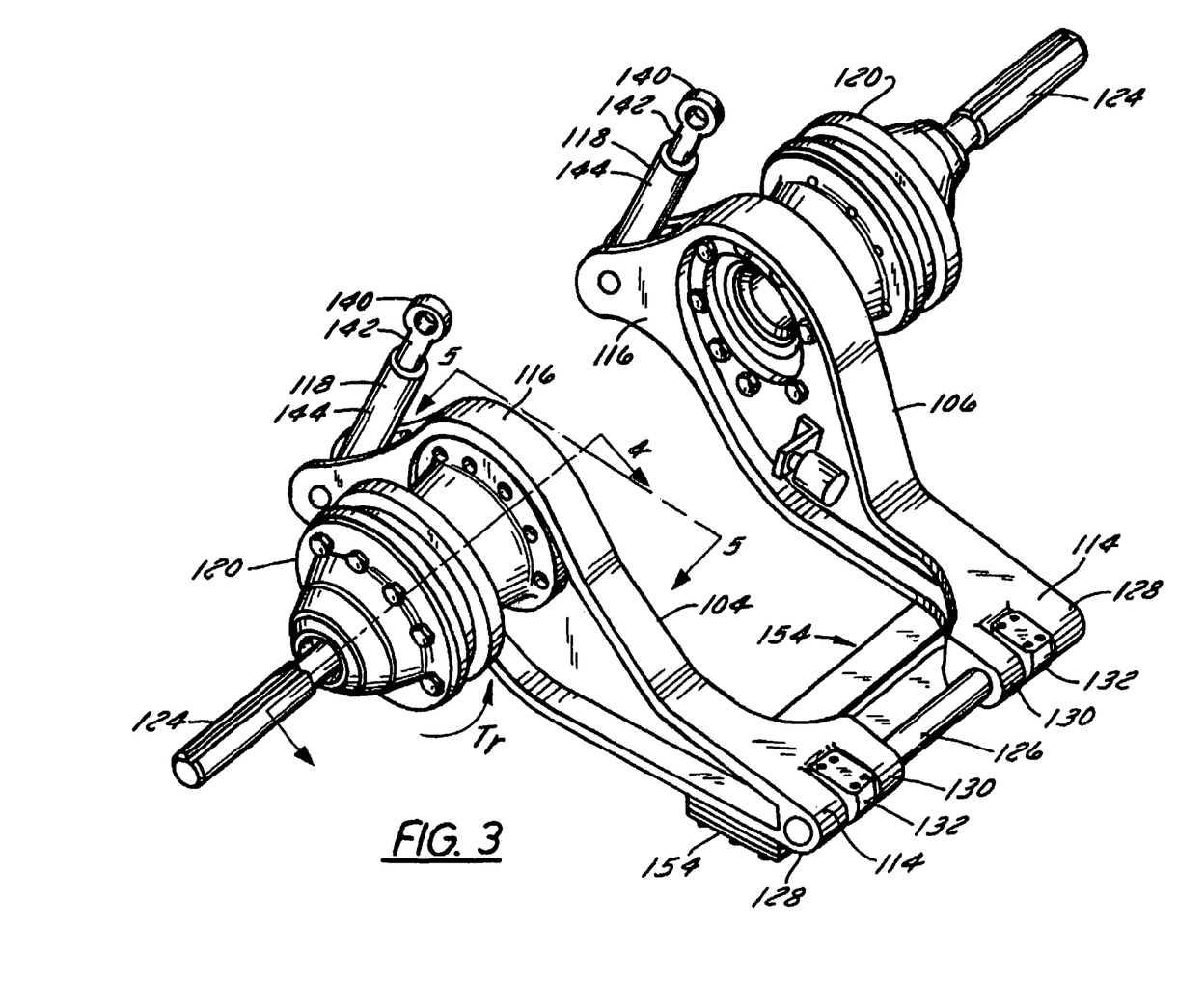
FIG. 3 is a perspective view of the left and right suspension arms, springs, anti-sway linkage and pivot pin of the tractor of the foregoing FIGURES.

FIGS. 1, 2 and 3 show a tractor 100 having a chassis 102 to which right and left suspension arms 104, 106 (FIG. 3) are coupled. Rear wheels 108, 110 are mounted to axles 124 extending from suspension arms 104, 106 and support the tractor for movement over the ground. The axles extend laterally, or side to side, with respect to the tractor. The wheels (including tires) preferably have a diameter of at least 1.5 meters, more preferably at least 2 meters, and even more preferably at least 2.5 meters. They may be fixed to axles 124 at several positions along the length of the axle including positions at least 0.25, 0.5, 1.0, and 1.5 meters or more away from the suspension arm. This is quite unlike automobiles or trucks, in which wheels of 0.3 meter diameter are mounted on axles that extend perhaps 0.2 meters from a suspension arm. Two front wheels 112 (only one shown) are coupled to the front portion of the chassis on opposite sides of the front end to support the front of the vehicle.

Referring in particular to FIG. 3, each suspension arm 104, 106 has a front end 114 and a rear end 116. The suspension arms are oriented generally fore-and-aft and extend longitudinally along the side of the tractor. The suspension arms are trailing links. The front end 114 is pivotally coupled to the chassis and the rear end 116 is supported by a spring 118. Spring 118 in the preferred embodiment shown here is a hydraulic cylinder that is coupled to a hydraulic circuit including valves and a gas-charged hydraulic accumulator (circuit not shown) to keep the spring 118 extended the appropriate amount.

Hydraulic cylinder 118 in the preferred embodiment shown here is coupled to a gas-charged hydraulic accumulator (not shown). As the tractor is loaded and unloaded, the hydraulic cylinders coupled to the accumulator (or accumulators) act as springs. When the load increases on the rear of the tractor, the suspension arms push upward on the cylinder portion of cylinders 118. This increases the hydraulic pressure in the cylinder and ejects hydraulic fluid into the gas-charged accumulator. This additional hydraulic fluid in the accumulator causes the pressure in the accumulator and the cylinder to increase until the cylinder pressure is just able to counteract the increased force acting on the swing arm.

When the load is decreased on the rear of the tractor, the reverse is true. Cylinders 118 gradually extend, pivoting the rear of suspension arms 104, 106 downward, permitting hydraulic fluid to escape the accumulator (or accumulators), and permitting the pressure inside the cylinders to decrease until it just balances the reduced load applied to suspension arms 104, 106.

Each suspension arm has an associated planetary gear system 120, which is fixed to the rear end 116 of each suspension arm 104, 106. The planetary gear system 120 supports the axle 124 that extends from the gear system. The left and right rear wheels 108,110 are mounted to left and right axles 124.

The front end 114 of each suspension arm 104, 106 is preferably coupled to chassis 102 by a pin 126. Pin 126 extends through an inner eye member 130 and an outer eye member 128 formed in the front end 114 of the suspension arm. Pin 126 also extends through an eye member 132 (FIG. 3) that is fixed to chassis 102 and fits between the inner and outer eye members 128, 130 on the suspension arms 104, 106. Pin 126, eye members 128, 130 and eye member 132 are closely toleranced, such that suspension arms 104, 106 are constrained by pin 126 to rotate about a laterally extending axis 134 best seen in FIG. 3. This arrangement also constrains the rear ends 116 of the two suspension arms to pivot about axis 134 and (in general) to move only up and down with respect to the chassis 102.

Referring to FIG. 2, each spring 118 is coupled at its lower end to its associated suspension arm by a pivot pin 136 that extends through the suspension arm and through an eye formed in the lower end of the spring 118. This arrangement permits the lower end of the spring 118 to pivot with respect to the suspension arm. A similar eye 140 is formed in the upper end of rod 142 extending from the hydraulic cylinder body 144 which is similarly pivotally coupled to a pin 146. Pin 146 is fixed to chassis 102 preferably via the tractor's rockshaft. However, the rod 142 may be coupled to the chassis at other locations.

The suspension arms pivot freely with respect to the chassis 102 with only two limits to their movement: the springs 118 and inter-arm, or anti-sway, link 154. As shown in FIG. 3, link 154 is coupled to and extends between both of the suspension arms 104,106. The anti-sway link 154 is essentially an anti-roll bar providing a passive, anti-roll function. The anti-sway link 154 can be used alone or in conjunction with other anti-roll features, such as active control of hydraulic springs 118. Such active anti-roll will be discussed in more detail below.

The anti-sway link 154 operates in the following way. When one wheel goes over a bump causing its suspension arm to pivot upward, the pivoting suspension arm flexes one end of link 154. The other end of link 154 is connected to the other suspension arm and reacts to this movement by attempting to pivot the other suspension arm upward to the exact same degree that the first suspension arm pivoted. The second suspension arm, however, is resting on ground (via the axle and wheel) at a slightly different height and is held against the ground by its own spring 118. Spring 118 of the second suspension arm resists the upward movement of the second suspension arm by link 154, preventing link 154 from moving the second suspension arm into a perfectly parallel relationship with the first suspension arm. As a result, both suspension arms do not move together to the same (i.e. parallel) positions, and the link 154 twists. The link thereby acts as a torsional spring to resist rolling motion by the tractor.

The link's ability to twist is due to its construction. As shown in FIG. 2, link 154 is formed as two parallel plates of steel 156, 158 that are spaced apart by spacers 160. Bolts 159 (FIG. 2) are inserted into holes in the ends of the plates and the spacers. These bolts are inserted into threaded holes in the suspension arms 104, 106 and tightened. Bolts 159 are located on each end of link 154 to secure left and right ends of link 154 to the left and right suspension arms, respectively.

Swing arms 104, 106 pivot about pin 126 with respect to the chassis of the tractor. As they pivot, they also flex with respect to the chassis of the tractor. To provide a substantially up-and-down movement, the pivot point defined by pin, 126 must be extended substantially ahead of the axles 124. This distance, unfortunately, requires that the swing arms extend several feet backward from the pivot point defined by pin 126. As a result, when large loads are placed on the tractor's wheels, the swing arms tend to flex laterally inward toward the center line of the vehicle or laterally outward away from the centerline in a direction generally parallel to the longitudinal axis of the axles 124.

These flexing forces put considerable stress on the forward ends 114 of the suspension arms and the eyes 132 and pin 126 to which the forward ends are coupled.

Figure 4:
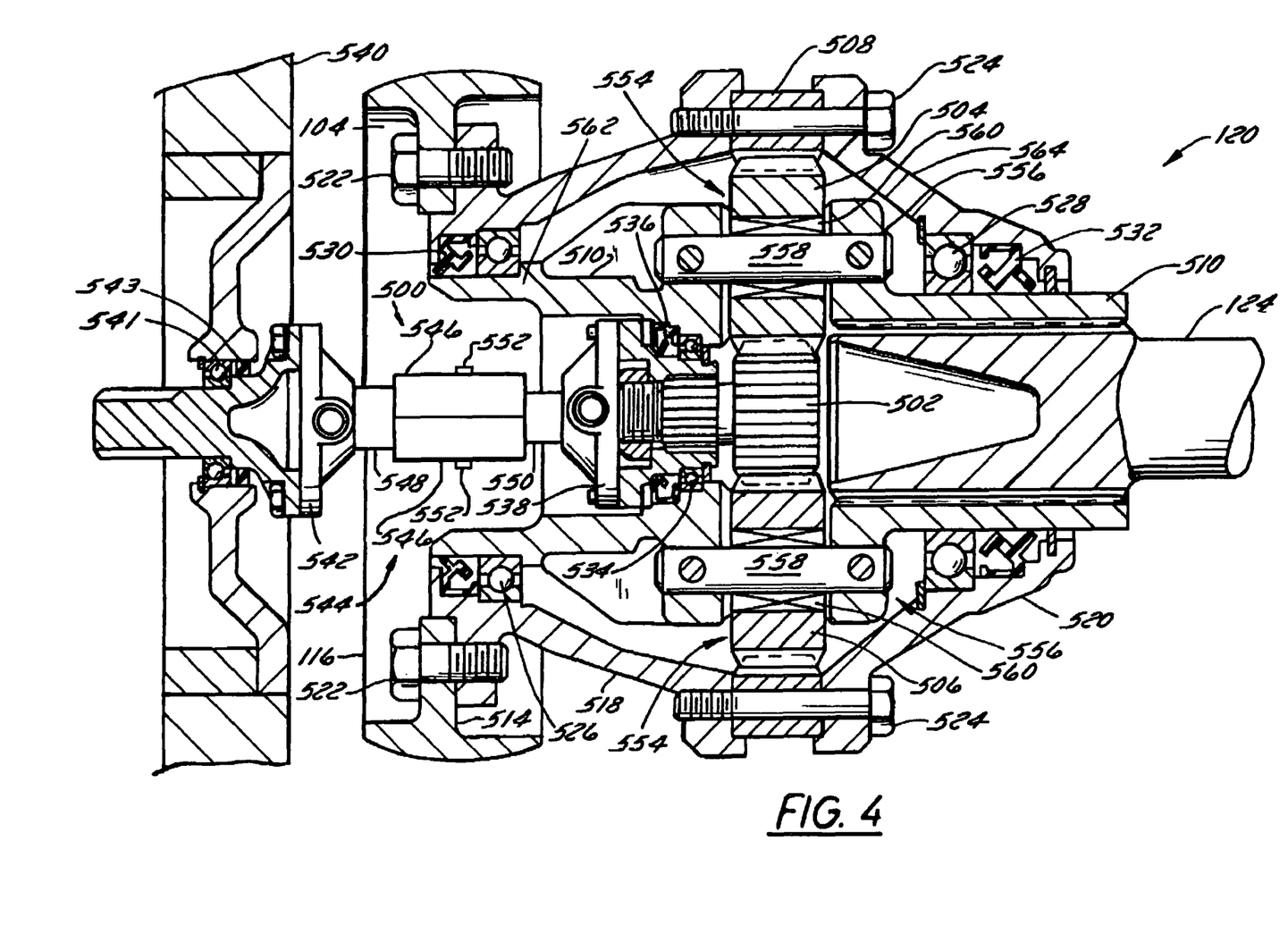
FIG. 4 is a partial cutaway rear view of the right side planetary gear system taken at section line 5-5 in FIG. 2.

FIG. 4 illustrates a preferred planetary gear arrangement of the suspension arms 104,106 of FIGS. 1-3. FIG. 4 is a cross section through the planetary gear system 120 of the right side suspension arm. It is taken at section line 5-5 of FIG. 2. The cutting plane that defines section 5-5 passes through the centerline of right side axle 124 to which the right wheel is mounted.

The discussion below relates to the right side planetary gear system. The left side planetary gear system is identically disposed and configured as the right side planetary gear system, but in mirror image form and on the opposite side of the vehicle on the left side suspension arm. Since the two are identical in construction and operation, we do not separately discuss the left side planetary gear system.

As shown in FIG. 4, planetary gear system 120 includes a drive shaft 500 that is coupled to a sun gear 502. The tractor engine, typically through a drive shafted connected to the engine's crankshaft and a set of differential gears, drives sun gear 502, which drives three planetary gears that engage a ring gear 508 (only two planetary gears 504, 506 are shown in FIG. 4).

In the embodiment of FIG. 4 the sun gear preferably has 15 teeth and the ring gear preferably has 73 teeth, although one of skill in the art will appreciate that any number of teeth may be used without departing from the scope of the invention. The planetary gears drive planetary gear carrier 510, which is coupled to and drives right side axle 124.

The gear system according to the embodiment shown in FIG. 4 comprises two casings 518 and 520. Casing 518 is bolted to outer wall 514 of suspension arm 104 by bolts 522. Casing 520 is bolted to casing 518 by bolts 524. Ring gear 508 is fixed between the two casings 518, 520 and is fixed to the two casings to make a rigid casing when bolts 524 are tightened.

Casings 518, 520 support two bearings 526 and 528, respectively, on their inner surfaces. These two bearings 526, 528 support the planetary gear carrier 510. Bearings 526 and 528 support the entire weight of the right rear side of the vehicle. Since the wheels may be mounted on axle 124 at some distance from bearings 526, 528, there may be a considerable overhanging load acting on these bearings. For this reason, they are preferably spaced apart a distance of several hundred millimeters, preferably at least 460 mm. The spacing of the bearings may be increased or decreased in application as is necessary; but one of ordinary skill will appreciate that greater bearing spacing—as is achieved in the preferred embodiment of this invention—is preferred because it withstands the overhanging load better than relatively narrow spacing.

Casings 518 and 520 also support two seals 530 and 532 that are disposed to seal against the inner and outer ends, respectively, of planetary gear carrier 510. These seals keep gear lubricant inside gear housing 516 and ensure that the gears are bathed in lubricant.

Axle 124 is force fit to planetary gear carrier 510 to collectively form a rigid rotating member that is disposed inside housing 516. As will be described in detail below, the planetary gear carrier 510 is in the form of a hollow cylinder that is configured to receive and support the sun gear for rotation in the inboard end of the carrier 510 and to receive (and be fixed to) the axle 124 in the outboard end of the carrier 510.

The sun gear 502 is supported inside the inboard hollow end of the gear carrier 510 on bearing 534. Bearing 534 permits free rotation of the sun gear 502 with respect to gear carrier 510. A seal 536 is fixed on the outboard side of the bearing 534 to ensure that gear lubricant does not leak out of housing 516 between the sun gear shaft and the inner surface of gear carrier 510.

Drive shaft 500 includes a first flexible rotating shaft coupling 538 (e.g. a universal joint or constant velocity joint, flexible link coupling, ball and socket joint or other coupling or joint configured to transmit torque and provide two degrees of rotational freedom) that is coupled to and drives sun gear 502. Coupling 538 permits the suspension arm 104 to pivot, or travel, up and down with respect to the differential housing 540.

The left end (in the FIGURE) of drive shaft 500 is supported for rotation in differential housing 540 by bearing 541, which permits the end of the drive shaft to rotate with respect to the differential housing. A seal 543 seals against drive shaft 500 and differential housing 540 to prevent differential-housing lubricant from leaking out of the differential housing. The differential gears to which the left end of drive shaft 500 is coupled have been removed for clarity of illustration in this FIGURE.

Drive shaft 500 includes a second flexible coupling 542. Coupling 542 also permits the suspension arm 104 to pivot up and down with respect to differential housing 540.

Drive shaft 500 includes a central drive shaft coupling 544 that is disposed between and couples stub shafts 548, 550 that extend from both flexible couplings, forming a central portion of the drive shaft. This central coupling includes two half-cylinder retainers 546. Retainers 546 are butted together to form a cylinder that surrounds and couples the free ends 548 and 550, preventing them from being completely pulled apart and separated. Two fasteners 552 extend through retainers 546 to secure them to stub shaft 548.

When suspension arm 104 is flexed under load and pulled away from differential housing 540 of chassis 102, it pulls stub shaft 550 (coupled to the suspension arm) away from stub shaft 548 (coupled to the differential housing). This causes the drive shaft to lengthen until it is fully extended and reaches an extension limit. At this point, the two stub shafts cannot be pulled apart further and resist further flexing of arm 104 away from the chassis 102. This applied force reduces the flexing of arm 104 and provides greater rigidity to the suspension.

Gear carrier 510 may be formed as a single cylindrical casting including a flared central portion, which includes machined bearing mounts and three machined slots 554 (two shown in FIG. 4) to receive the three planetary gears. Through holes 556 are machined in the carrier 510 to receive planetary gear axles 558. Bearings 560 are disposed between the planetary gears and their respective axles to support the planetary gears for rotation on their axles.

In an alternative arrangement, however, gear carrier 510 is formed from two castings, rather than a single casting. A flanged, inner cylindrical portion 562 and a flanged, outer cylindrical portion 564 of planetary gear system 120 may be separately cast and subsequently bolted together with their flanged ends facing each other.

It should be noted that FIG. 4 shows two planetary gears 504, 506 that are spaced apart by 180 degrees about drive shaft 500. All three planetary gears are actually disposed at 120 degrees with respect to one another about the longitudinal axis of the planetary gear system 120. It is for ease of illustration, understanding, and explanation that only two planetary gears are shown in FIG. 4 and that they are shown spaced 180 degrees apart.

The two casings 518, 520 are preferably generally conical. Casing 518 is preferably in the form of a conical section with its vertex pointing inward toward the differential housing and casing 520 is preferably in the form of a conical section with its vertex pointing away from the differential housing. This conical configuration provides a flaring inner surface on both casings that makes it easy to mount the seals and the bearings.

Figure 5:
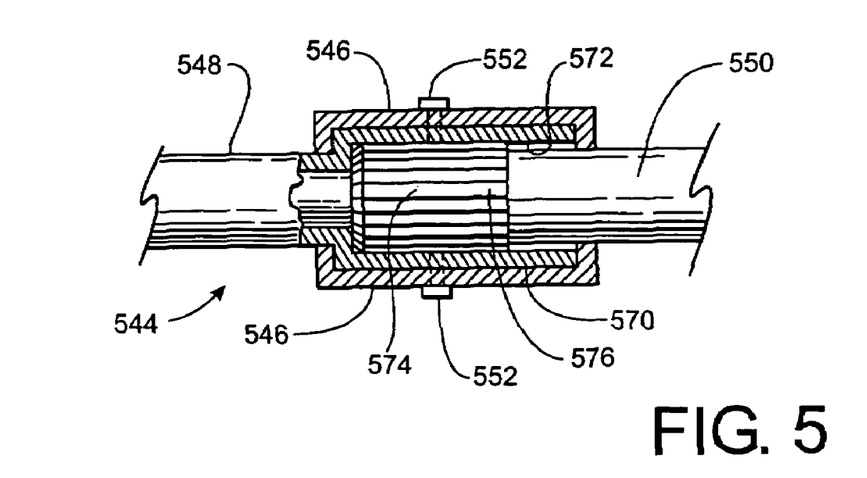
FIG. 5 is a fragmentary longitudinal cross-sectional view of the drive shaft coupling of FIG. 4 with the coupling in its completely collapsed position, the cross section being taken through the central longitudinal axis of the drive shaft coupling.
Figure 6:
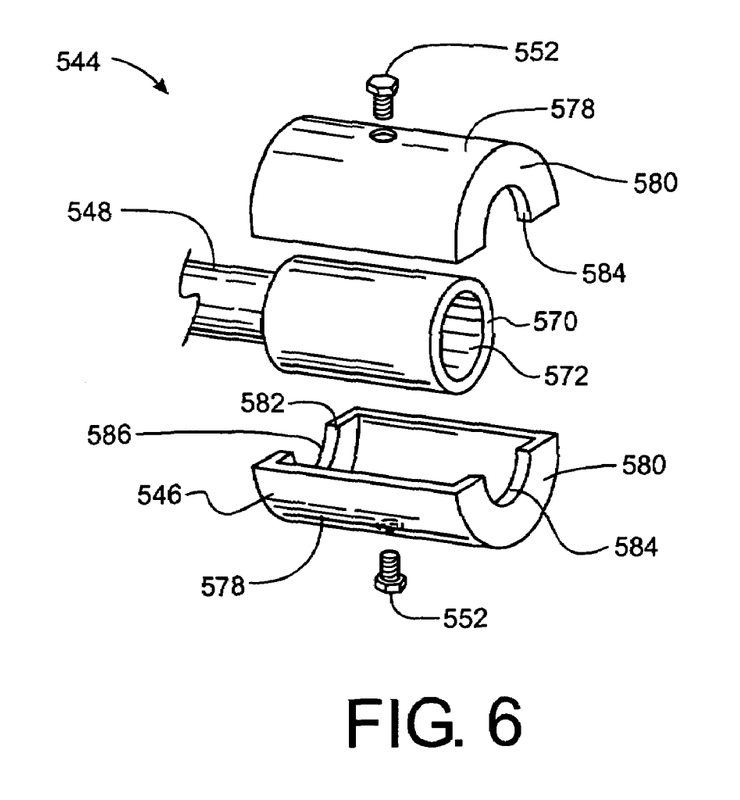
FIG. 6 is an exploded perspective view of the drive shaft coupling of FIG. 5.
Figure 7:
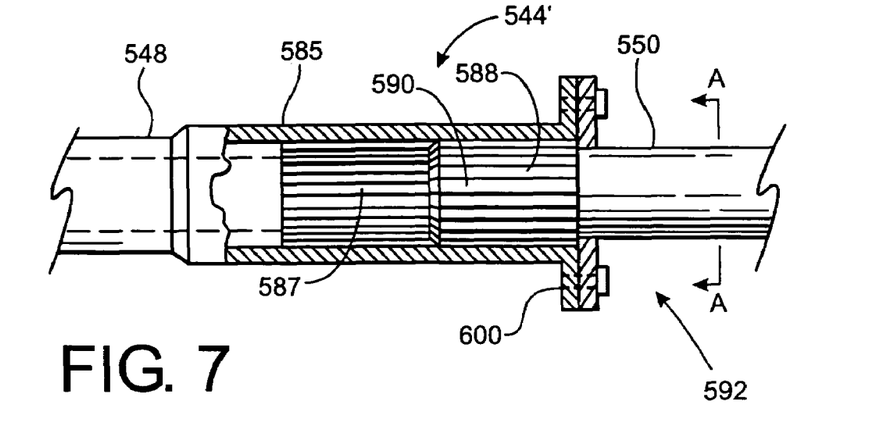
FIG. 7 is a fragmentary cross-sectional view of an alternative drive shaft coupling to be used in place of the coupling of FIGS. 4-6. The coupling is shown in its completely extended position.

FIGS. 5 and 6 illustrate central drive shaft coupling 544 in greater detail. Coupling 544 includes a cup 570 having internal splines 572 that extend longitudinally on an inner surface of cup 570. Cup 570 is fixed to and coaxial with an end of shaft 548. Coupling 544 also includes a cylinder 574 having external splines 576 that is disposed to fit inside cup 570 and mate with the splines 572 of cup 570. Cylinder 574 is fixed to the end of and is coaxial with shaft 550. The longitudinal orientation of the splines permits relative sliding axial movement of the cup with respect to the cylinder. The cylinder 574 can telescope into and out of the cup 570. Yet the splines transmit force in a circumferential direction, permitting shaft 548 to rotate and to drive shaft 550 in rotation. Thus, coupling 544 permits stub shaft 548 and stub shaft 550 to translate with respect to each other along a common longitudinal axis.

Retainers 546 are identically constructed and dimensioned. They are in the form of the hollow half-cylinders that extend around and couple stub shaft 548 to stub shaft 550. Each of retainers 546 includes a cylindrical shell portion 578 to which inwardly extending flanges 580, 582 are fixed on either end. Flanges 580, 582 are fixed at opposite ends of shell portions 578 and include semicircular reliefs or cut outs 584, 586. When the two retainers 546 are butted together (see FIGS. 4-5), reliefs 584 mate with each other and define a circular opening large enough to permit stub shaft 550 to pass through, but small enough to prevent cylinder 574 from being withdrawn from cup 570. Stub shaft 550 is dimensioned to slide within the circular opening defined by reliefs 584.

Coupling 544 is configured to transmit both tensile and compressive forces along the longitudinal axis of the drive shaft and hence from arm 104 to chassis 102. It is designed to do this during normal operation of the vehicle. It is within the normal design and operational limits of the coupling and also within the normal design and operational limits of the bearings 534, 541 that support both ends of drive shaft 500. The coupling 544 transmits these longitudinal loads or forces in order to reduce both the lateral inward and the outward flexure of suspension arm 104 with respect to chassis 102.

It should be noted at this point that the coupling prevents or reduces flexure within the normal operating mode of the tractor. Other drive shaft couplings may exist that transmit tensile or compressive loads, but they are not configured to do so within the normal operating conditions or limits of the tractor. The traditional arrangement has been to permit some extension of a drive shaft to accommodate the relative pivoting movement of a suspension arm or linkage. This extension of these drive shafts do not actually reach a limit in which the drive shaft transmitted tensile or compressive forces within the normal design limits of the suspension were exceeded, however. Not until the suspension components to which the drive shaft was coupled are flexed beyond their normal operating limits, outside of their normal operating range, and bent or otherwise damaged by plastic deformation would such a drive shaft have reached a point at which it would transmit tensile or compressive loads that serve to restrain the movement of a suspension arm or linkage.

During heavy load conditions, suspension arm 104 may be flexed outwardly away from chassis 102 and differential housing 540. As these loads increase, suspension arm 104 is flexed outward and pulled away from chassis 102 until the extension limit of coupling 544 is reached. At this point, shaft 550 is almost withdrawn from cup 570, but not quite. Cylinder 574 abuts the inner surfaces of flanges 580, which places the entire drive shaft in axial tension. Further separation of the two shafts is prevented. Drive shaft 500 thereby transfers tensile loads from the rear end of suspension arm 104 to chassis 102, supporting suspension arm 104 and preventing or reducing further outward flexure under load. Drive shaft 500 is configured to transmit these loads without damage to the drive shaft or the suspension arm.

Heavy loads may also flex suspension arm 104 inward, toward chassis 102 and differential housing 540. As these loads approach the design limit, suspension arm 104 is flexed inward and pushed toward chassis 102 until the fully retracted or collapsed position (FIG. 5) of coupling 544 is reached. At this point, shaft cylinder 574 is fully inserted into cup 570. Cylinder 574 abuts the end of shaft 548, which places the entire drive shaft in axial compression. Further collapse of one shaft toward the other is prevented. Drive shaft 500 thereby transfers compressive loads from the rear end of suspension arm 104 to chassis 102, supporting suspension arm 104 and preventing or reducing further inward flexure of arm 104 under load. Drive shaft 500 is configured to transmit these loads without damage to the drive shaft or the suspension arm.

The inward and outward extension limits of the two drive shafts with respect to each other are preferably reached only under extreme load conditions. During normal unloaded or lightly loaded operation, coupling 544 is not positioned at either of these two extreme positions. All the suspension components are preferably dimensioned such that cylinder 574 is disposed in the central region of cup 570 during normal operation and therefore transmit no axial loads either inward (compression) or outward (tension) between the suspension arm 104 and the chassis 102. This reduces component wear during normal operation.

FIGS. 7 through 10 illustrate a second alternative coupling 544' they can be used in place of coupling 544 in any of the embodiments shown or described herein.

Coupling 544' comprises a cup 585 having internal splines 587 that extend longitudinally and inwardly. Coupling 544' also includes a cylinder 588 having longitudinally and outwardly extending external spines 590. Splines 590 mate with splines 587, permitting cylinder 588 to slide freely in a longitudinal direction with respect to cup 585. Cylinder 588 can be telescopically extended from and retracted into cup 585. Cup 585 is fixed to the end of and is coaxial to stub shaft 548. Cylinder 588 is fixed to the end of and is coaxial to stub shaft 550. Thus, coupling 544' permits stub shaft 548 and stub shaft 550 to translate with respect to each other along a common longitudinal axis.

Coupling 544' also comprises cylinder retainer 592. Cylinder 588 is retained within cup 585 by cylinder retainer 592 (shown herein as two plates 594, 596) that is fixed with ten threaded fasteners 598 to a mating and outwardly extending flange 600 that is fixed to, extends outward from, and defines the open end of cup 585.

Figure 9:
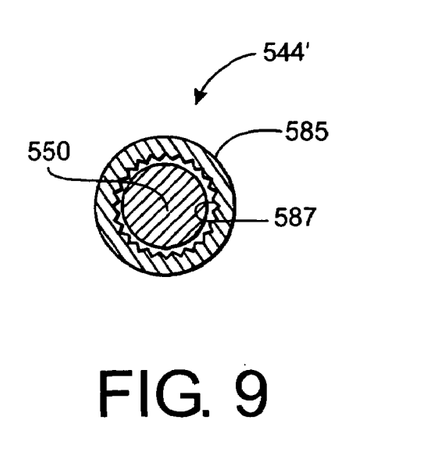
FIG. 9 is a cross-sectional view of the drive shaft coupling of FIGS. 7-8 taken along section line B-B in FIG. 8.
Figure 10:
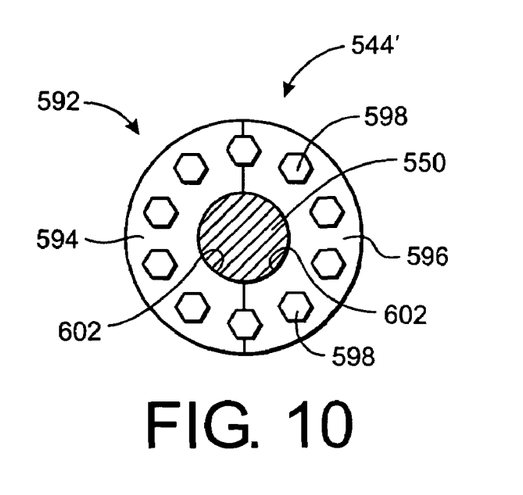
FIG. 10 is a cross-sectional view of the drive shaft coupling of FIGS. 7-9 taken along section line A-A in FIG. 7.

Plates 594, 596 are both semicircular and have semicircular reliefs or recesses 602 formed in one edge. These reliefs or recesses 602 are arranged to abut each other and form a circular opening. The circular opening is large enough to permit stub shaft 550 to slide freely in and out of cup 585. The circular opening is small enough to prevent cylinder 588 from being withdrawn from cup 585.

Figure 8:
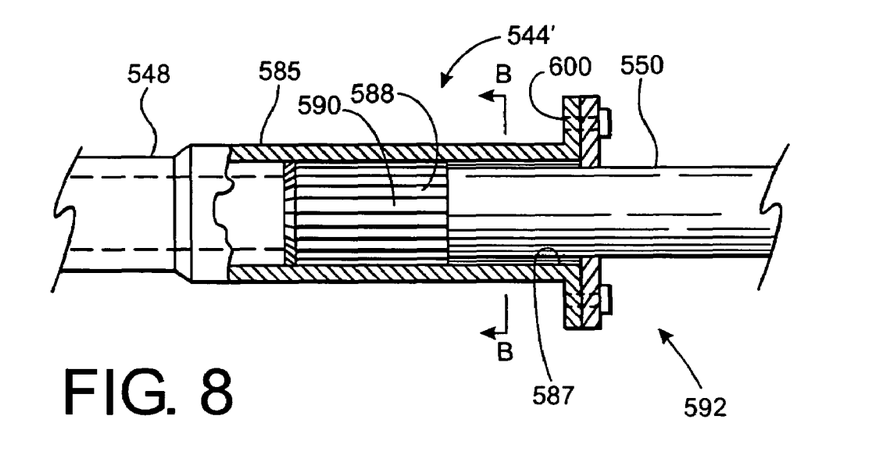
FIG. 8 is a fragmentary cross-sectional view of the coupling of FIG. 7. The coupling is shown in its completely collapsed or retracted position.

The relative movement of cup 585 with respect to cylinder 588, and stub shaft 548 with respect to stub shaft 550 is restricted in both directions, however. Inward movement of cylinder 588 within cup 585 is prevented when cylinder 588 abuts the end of stub shaft 548. This completely collapsed or retracted position is shown in FIG. 8. Likewise, the outward movement of cylinder 588 with respect to cup 585 is prevented when the outer peripheral edge of cylinder 588 abuts inwardly extending flanges 590.

Coupling 544' functions the same as coupling 544. Whenever suspension arm 104 is flexed outwards under load, coupling 544' extends to its fullest extent (see e.g. FIG. 7) and then resists further extension. Whenever suspension arm 104 is flexed inwards under load, coupling 544' collapses or retracts to its fullest extent (see e.g. FIG. 8) and then resists further retraction. In both cases, coupling 544' communicates tensile and compressive forces from stub shaft 548 to stub shaft 550 and thereby reduces both the inward and outward flexure of suspension arm 104 under heavy loads.

The fully extended and fully retracted positions of coupling 544 and 544' are within the standard operational limits of the tractor. In other words, the coupling 544' is intended to be placed in tension and compression in the identical manner and for the same purpose as coupling 544.

The length of relative sliding movement of the coupling and the rigidity of the suspension arm are selected such that the suspension arm can be flexed outward and inward under design operating conditions to tension or compress the coupling. In this manner, the suspension arm can be made thinner, lighter and more flexible than would normally be the case, with the knowledge that the coupling 544, 544' will support the suspension arm when needed.

From the foregoing detailed description of the preferred embodiments, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

I claim:

1. A rear tractor suspension for a tractor chassis having a differential mounted in a differential housing, the suspension comprising:
   a longitudinally extending suspension arm pivotally coupled to the chassis;
   a planetary gearbox fixed to the suspension arm; and
   a drive shaft rotatably supported at one end by the planetary gearbox, and rotatably supported at another end by the differential housing, wherein the drive shaft is configured to reduce additional outward flexure of the suspension arm when the suspension arm is outwardly flexed, and to reduce additional inward flexure of the suspension arm when the suspension arm is inwardly flexed.

2. The suspension of claim 1, wherein the drive shaft further comprises first and second stub shafts coupled together to permit the stub shafts relative longitudinal sliding movement and to communicate a longitudinal tensile load when suspension arm is flexed.

3. The suspension of claim 1, wherein the drive shaft is configured to be placed in longitudinal compression during elastic deformation of the suspension arm inward toward the chassis and to be placed in longitudinal tension during elastic deformation of the suspension arm outward away from the chassis, respectively.

4. The suspension of claim 3, wherein the tension and the compression communicate a load from the suspension arm to the chassis of the vehicle.

5. The suspension of claim 1, wherein the drive shaft reduces outward flexure of the suspension arm by being placed in tension and wherein the drive shaft reduces inward flexure of the suspension arm by being placed in compression.

6. The suspension of claim 1, wherein the drive shaft further comprises:
   first and second flexible shaft couplings; and
   a sliding coupling that is coupled to and between the first and second flexible shaft couplings.

7. A rear suspension for an agricultural tractor having a chassis comprised of an engine, a transmission and rear differential housing fixed together to form an elongate rigid member, the suspension comprising:
a longitudinally extending suspension arm coupled to the chassis to pivot with respect thereto about a laterally-extending axis;
a planetary gearbox fixed to the suspension arm; and
a drive shaft rotatably supported at one drive shaft end by the planetary gearbox and rotatably supported at another drive shaft end by the tractor chassis, wherein the drive shaft is configured to be longitudinally compressed to reduce lateral inward flexure of the suspension arm, and configured to be longitudinally tensioned to reduce lateral outward flexure of the suspension arm during normal operation.

8. The suspension of claim 7, wherein the drive shaft further comprises first and second stub shafts coupled together with a sliding coupling to communicate torque from one stub shaft to the other stub shaft, to permit sliding relative longitudinal movement of the stub shafts, to communicate a tensile load from one stub shaft to the other stub shaft when the coupling is collapsed, and to communicate a compressive load from one stub shaft to the other stub shaft when the coupling is extended.

9. The suspension of claim 8 wherein the sliding coupling is configured to be placed in longitudinal tension by flexure of the suspension arm away from the chassis of the tractor and placed in longitudinal compression by flexure of the suspension arm toward the chassis of the tractor.

10. The suspension of claim 9, wherein the tension and the compression communicate a load on the suspension arm to the chassis of the vehicle.

11. The suspension of claim 7, wherein the drive shaft further comprises first and second flexible shaft couplings connected by a sliding coupling to communicate torque from one shaft coupling to the other, the first and second flexible shaft couplings disposed in the drive shaft to support opposing ends of the sliding coupling.

12. The suspension of claim 7, wherein the drive shaft reduces outward suspension arm flexure by being placed in tension and reduces inward suspension arm flexure by being placed in compression.

13. A rear tractor suspension for a tractor chassis having a differential mounted in a differential housing, the suspension comprising:
a longitudinally extending suspension arm pivotally coupled to the chassis;
a planetary gearbox fixed to the suspension arm; and
a means for rotatably driving the planetary gearbox, said means being supported for rotation both by the planetary gearbox and by the tractor chassis, wherein the means for rotatably driving is configured to be longitudinally tensioned and compressed during when the suspension arm is flexed.

14. The suspension of claim 13, wherein the means for rotatably driving further comprises:
first flexible coupling means;
second flexible coupling means; and
slidable coupling means;
wherein the first flexible coupling means is fixed to a first end of the slidable coupling means and the second flexible coupling means is fixed to another end of the slidable coupling means.

15. The suspension of claim 14, wherein the slidable coupling means includes means for telescopically extending and retracting and means for transmitting torque.

16. The suspension of claim 15, wherein the tension and the compression communicate a load on the suspension arm to the chassis of the vehicle.

17. The suspension of claim 14, wherein the slidable coupling means reduces outward arm flexure by being placed in tension and reduces inward arm flexure by being placed in compression.

18. The suspension of claim 14, wherein one end of the slidable coupling means comprises a cup having internal splines.

19. The suspension of claim 18, wherein the other end of the slidable coupling means comprises a cylinder having external splines.

20. The suspension of claim 19, wherein the cylinder is slidably supported within the cup and the internal splines are engaged with the external splines.

21. The suspension of claim 13, wherein the slidable coupling means is configured to be placed in longitudinal compression by non-plastic deformation of the suspension arm inward toward the chassis and in longitudinal tension by non-plastic deformation of the suspension arm outward away from the chassis, respectively.

* * * * *